United States Patent
Ronen et al.

(10) Patent No.: US 11,870,682 B2
(45) Date of Patent: Jan. 9, 2024

(54) DEADLOCK-FREE LOCAL REROUTING FOR HANDLING MULTIPLE LOCAL LINK FAILURES IN HIERARCHICAL NETWORK TOPOLOGIES

(71) Applicant: MELLANOX TECHNOLOGIES, LTD., Yokneam (IL)

(72) Inventors: Tamir Ronen, Pardes Hana-Karkur (IL); Josef Yallouz, Kibbutz Shaar Haamakim (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 88 days.

(21) Appl. No.: 17/353,869

(22) Filed: Jun. 22, 2021

(65) Prior Publication Data
US 2022/0407796 A1    Dec. 22, 2022

(51) Int. Cl.
*H04L 45/00*    (2022.01)
*H04L 41/0654*  (2022.01)
*H04L 45/28*    (2022.01)

(52) U.S. Cl.
CPC .......... *H04L 45/22* (2013.01); *H04L 41/0654* (2013.01); *H04L 45/28* (2013.01)

(58) Field of Classification Search
CPC ...... H04L 45/22; H04L 41/0654; H04L 45/28
See application file for complete search history.

(56) References Cited

U.S. PATENT DOCUMENTS

| | | |
|---|---|---|
| 4,312,064 A | 1/1982 | Bench et al. |
| 6,115,385 A | 9/2000 | Vig |

(Continued)

FOREIGN PATENT DOCUMENTS

| | | |
|---|---|---|
| CN | 1394053 A | 1/2003 |
| CN | 105141512 A | 12/2015 |

(Continued)

OTHER PUBLICATIONS

Nkposong et al., "Experiences with BGP in Large Scale Data Centers: Teaching an Old Protocol New Tricks", pp. 1-47, JANOG33 Meeting (Japan Network Operators' Group), Beppu City, Japan, Jan. 23-24, 2014.

Infiniband Trade Association, "Supplement to Infiniband Architecture Specification," vol. 1, release 1.2.1—Annex A17: RoCEv2, pp. 1-23, Sep. 2, 2014.

Infiniband Trade Association, "InfiniBand Architecture Specification," vol. 1, Release 1.5, Jun. 2, 2021, Draft, Table 6 (Base Transport Header Fields), pp. 1-2, year 2021.

(Continued)

*Primary Examiner* — Chris Parry
*Assistant Examiner* — Dixon F Dabipi
(74) *Attorney, Agent, or Firm* — Kligler & Associates Patent Attorneys Ltd.

(57) ABSTRACT

A method for communication includes partitioning local links in a subnetwork of a packet data network into at least first and second groups. For each local link that connects a first upper-tier switch to a first lower-tier switch in the subnetwork, a corresponding detour route is defined, passing through a first local link belonging to the first group from the first upper-tier switch to a second lower-tier switch, and from the second lower-tier switch over a second local link to a second upper-tier switch, and from the second upper-tier switch over a third local link belonging to the second group to the first lower-tier switch. Upon a failure of the local link connecting the first upper-tier switch to the first lower-tier switch, data packets arriving from the network at the first upper-tier switch are rerouted to pass via the corresponding detour route to the first lower-tier switch.

18 Claims, 3 Drawing Sheets

(56) References Cited

U.S. PATENT DOCUMENTS

| | | |
|---|---|---|
| 6,169,741 B1 | 1/2001 | LeMaire et al. |
| 6,480,500 B1 | 11/2002 | Erimli et al. |
| 6,532,211 B1 | 3/2003 | Rathonyi et al. |
| 6,553,028 B1 * | 4/2003 | Tang .................. H04L 45/02 370/389 |
| 6,614,758 B2 | 9/2003 | Wong |
| 6,665,297 B1 | 12/2003 | Harigochi et al. |
| 6,775,268 B1 | 8/2004 | Wang et al. |
| 6,795,886 B1 | 9/2004 | Nguyen |
| 6,804,532 B1 | 10/2004 | Moon et al. |
| 6,807,175 B1 | 10/2004 | Jennings et al. |
| 6,831,918 B1 | 12/2004 | Kavak |
| 6,912,589 B1 | 6/2005 | Jain et al. |
| 6,912,604 B1 | 6/2005 | Tzeng et al. |
| 6,950,428 B1 | 9/2005 | Horst et al. |
| 7,010,607 B1 | 3/2006 | Bunton |
| 7,076,569 B1 | 7/2006 | Bailey et al. |
| 7,221,676 B2 | 5/2007 | Green et al. |
| 7,234,001 B2 | 6/2007 | Simpson et al. |
| 7,274,869 B1 | 9/2007 | Pan et al. |
| 7,286,535 B2 | 10/2007 | Ishikawa et al. |
| 7,401,157 B2 | 7/2008 | Costantino et al. |
| 7,590,110 B2 | 9/2009 | Beshai et al. |
| 7,676,597 B2 | 3/2010 | Kagan et al. |
| 7,746,854 B2 | 6/2010 | Ambe et al. |
| 7,899,930 B1 | 3/2011 | Turner et al. |
| 7,924,837 B1 | 4/2011 | Shabtay et al. |
| 7,936,770 B1 | 5/2011 | Frattura et al. |
| 7,969,980 B1 | 6/2011 | Florit et al. |
| 8,094,569 B2 | 1/2012 | Gunukula et al. |
| 8,175,094 B2 | 5/2012 | Bauchot et al. |
| 8,195,989 B1 | 6/2012 | Lu et al. |
| 8,213,315 B2 | 7/2012 | Crupnicoff et al. |
| 8,401,012 B2 | 3/2013 | Underwood et al. |
| 8,489,718 B1 | 7/2013 | Brar et al. |
| 8,495,194 B1 | 7/2013 | Brar et al. |
| 8,570,865 B2 | 10/2013 | Goldenberg et al. |
| 8,576,715 B2 | 11/2013 | Bloch et al. |
| 8,605,575 B2 | 12/2013 | Gunukula et al. |
| 8,621,111 B2 | 12/2013 | Marr et al. |
| 8,625,427 B1 | 1/2014 | Terry et al. |
| 8,681,641 B1 | 3/2014 | Sajassi et al. |
| 8,737,269 B1 | 5/2014 | Zhou et al. |
| 8,755,389 B1 | 6/2014 | Poutievski et al. |
| 8,774,063 B2 | 7/2014 | Beecroft |
| 8,867,356 B2 | 10/2014 | Bloch et al. |
| 8,873,567 B1 | 10/2014 | Mandal et al. |
| 8,908,510 B2 | 12/2014 | Sela et al. |
| 8,908,704 B2 | 12/2014 | Koren et al. |
| 9,014,006 B2 | 4/2015 | Haramaty et al. |
| 9,042,234 B1 | 5/2015 | Liljenstolpe et al. |
| 9,137,143 B2 | 9/2015 | Parker et al. |
| 9,231,888 B2 | 1/2016 | Bogdanski et al. |
| 9,264,382 B2 | 2/2016 | Bogdanski et al. |
| 9,385,949 B2 | 7/2016 | Vershkov et al. |
| 9,544,185 B1 | 1/2017 | Yadav et al. |
| 9,548,960 B2 | 1/2017 | Haramaty et al. |
| 9,571,400 B1 | 2/2017 | Mandal et al. |
| 9,584,429 B2 | 2/2017 | Haramaty et al. |
| 9,699,095 B2 | 7/2017 | Elias et al. |
| 9,729,473 B2 | 8/2017 | Haramaty et al. |
| 9,876,727 B2 | 1/2018 | Gaist et al. |
| 9,985,910 B2 | 5/2018 | Gafni et al. |
| 10,009,277 B2 | 6/2018 | Goldenberg et al. |
| 10,079,782 B2 | 9/2018 | Haramaty et al. |
| 10,200,294 B2 | 2/2019 | Shpiner et al. |
| 10,205,683 B2 | 2/2019 | Elias et al. |
| 10,218,642 B2 | 2/2019 | Mula et al. |
| 10,230,652 B2 | 3/2019 | Haramaty et al. |
| 10,389,646 B2 | 8/2019 | Zdornov et al. |
| 10,554,556 B2 | 2/2020 | Haramaty et al. |
| 10,574,546 B2 | 2/2020 | Levi et al. |
| 10,644,995 B2 | 5/2020 | Levy et al. |
| 11,310,163 B1 | 4/2022 | Lo et al. |
| 2001/0043564 A1 | 11/2001 | Bloch et al. |
| 2001/0043614 A1 | 11/2001 | Viswanadhham et al. |
| 2002/0009073 A1 | 1/2002 | Furukawa et al. |
| 2002/0013844 A1 | 1/2002 | Garrett et al. |
| 2002/0026525 A1 | 2/2002 | Armitage |
| 2002/0039357 A1 * | 4/2002 | Lipasti .................. H04L 45/00 370/338 |
| 2002/0067693 A1 * | 6/2002 | Kodialam ............... H04L 45/28 370/227 |
| 2002/0071439 A1 | 6/2002 | Reeves et al. |
| 2002/0085586 A1 | 7/2002 | Tzeng |
| 2002/0136163 A1 | 9/2002 | Kawakami et al. |
| 2002/0138645 A1 | 9/2002 | Shinomiya et al. |
| 2002/0141412 A1 | 10/2002 | Wong |
| 2002/0165897 A1 | 11/2002 | Kagan et al. |
| 2002/0176363 A1 | 11/2002 | Durinovic-Johri et al. |
| 2003/0016624 A1 | 1/2003 | Bare |
| 2003/0039260 A1 | 2/2003 | Fujisawa |
| 2003/0065856 A1 | 4/2003 | Kagan et al. |
| 2003/0079005 A1 | 4/2003 | Myers et al. |
| 2003/0097438 A1 | 5/2003 | Bearden et al. |
| 2003/0223453 A1 | 12/2003 | Stoler et al. |
| 2004/0024903 A1 | 2/2004 | Costatino et al. |
| 2004/0062242 A1 | 4/2004 | Wadia et al. |
| 2004/0111651 A1 | 6/2004 | Mukherjee et al. |
| 2004/0202473 A1 | 10/2004 | Nakamura et al. |
| 2005/0013245 A1 | 1/2005 | Sreemanthula et al. |
| 2005/0154790 A1 | 7/2005 | Nagata et al. |
| 2005/0157641 A1 | 7/2005 | Roy |
| 2005/0259588 A1 | 11/2005 | Preguica |
| 2006/0126627 A1 | 6/2006 | Diouf |
| 2006/0143300 A1 | 6/2006 | See et al. |
| 2006/0182034 A1 | 8/2006 | Klinker et al. |
| 2006/0215645 A1 | 9/2006 | Kangyu |
| 2006/0291480 A1 | 12/2006 | Cho et al. |
| 2007/0030817 A1 | 2/2007 | Arunachalam et al. |
| 2007/0058536 A1 | 3/2007 | Vaananen et al. |
| 2007/0058646 A1 | 3/2007 | Hermoni |
| 2007/0070998 A1 | 3/2007 | Sethuram et al. |
| 2007/0091911 A1 | 4/2007 | Watanabe et al. |
| 2007/0104192 A1 | 5/2007 | Yoon et al. |
| 2007/0183418 A1 | 8/2007 | Riddoch et al. |
| 2007/0223470 A1 | 9/2007 | Stahl |
| 2007/0237083 A9 | 10/2007 | Oh et al. |
| 2008/0002690 A1 | 1/2008 | Ver Steeg et al. |
| 2008/0101378 A1 | 5/2008 | Krueger |
| 2008/0112413 A1 | 5/2008 | Pong |
| 2008/0165797 A1 | 7/2008 | Aceves |
| 2008/0186981 A1 | 8/2008 | Seto et al. |
| 2008/0189432 A1 | 8/2008 | Abali et al. |
| 2008/0267078 A1 | 10/2008 | Farinacci et al. |
| 2008/0298248 A1 | 12/2008 | Roeck et al. |
| 2009/0010159 A1 | 1/2009 | Brownell et al. |
| 2009/0022154 A1 | 1/2009 | Kiribe et al. |
| 2009/0097496 A1 | 4/2009 | Nakamura et al. |
| 2009/0103534 A1 | 4/2009 | Malledant et al. |
| 2009/0119565 A1 | 5/2009 | Park et al. |
| 2009/0262741 A1 | 10/2009 | Jungck et al. |
| 2010/0020796 A1 | 1/2010 | Park et al. |
| 2010/0039959 A1 | 2/2010 | Gilmartin |
| 2010/0049942 A1 | 2/2010 | Kim et al. |
| 2010/0111529 A1 | 5/2010 | Zeng et al. |
| 2010/0141428 A1 | 6/2010 | Mildenberger et al. |
| 2010/0189113 A1 | 7/2010 | Csaszar et al. |
| 2010/0216444 A1 | 8/2010 | Mariniello et al. |
| 2010/0284404 A1 | 11/2010 | Gopinath et al. |
| 2010/0290385 A1 | 11/2010 | Ankaiah et al. |
| 2010/0290458 A1 | 11/2010 | Assarpour et al. |
| 2010/0315958 A1 | 12/2010 | Luo et al. |
| 2011/0019673 A1 * | 1/2011 | Fernandez ............ H04L 12/185 370/390 |
| 2011/0080913 A1 | 4/2011 | Liu et al. |
| 2011/0085440 A1 | 4/2011 | Owens et al. |
| 2011/0085449 A1 | 4/2011 | Jeyachandran et al. |
| 2011/0090784 A1 | 4/2011 | Gan |
| 2011/0164496 A1 | 7/2011 | Loh et al. |
| 2011/0164518 A1 | 7/2011 | Daraiseh et al. |
| 2011/0225391 A1 | 9/2011 | Burroughs et al. |
| 2011/0249679 A1 | 10/2011 | Lin et al. |
| 2011/0255410 A1 | 10/2011 | Yamen et al. |

(56) References Cited

U.S. PATENT DOCUMENTS

| | | |
|---|---|---|
| 2011/0265006 A1 | 10/2011 | Morimura et al. |
| 2011/0299529 A1 | 12/2011 | Olsson et al. |
| 2012/0020207 A1 | 1/2012 | Corti et al. |
| 2012/0075999 A1 | 3/2012 | Ko et al. |
| 2012/0082057 A1 | 4/2012 | Welin et al. |
| 2012/0144065 A1 | 6/2012 | Parker et al. |
| 2012/0147752 A1 | 6/2012 | Ashwood-Smith et al. |
| 2012/0163797 A1 | 6/2012 | Wang |
| 2012/0170582 A1 | 7/2012 | Abts et al. |
| 2012/0207175 A1 | 8/2012 | Raman et al. |
| 2012/0250500 A1* | 10/2012 | Liu .................. H04L 45/28 370/228 |
| 2012/0250679 A1 | 10/2012 | Judge et al. |
| 2012/0287791 A1 | 11/2012 | Xi et al. |
| 2012/0300669 A1 | 11/2012 | Zahavi |
| 2012/0314706 A1 | 12/2012 | Liss |
| 2013/0044636 A1 | 2/2013 | Koponen et al. |
| 2013/0071116 A1 | 3/2013 | Ong |
| 2013/0083701 A1 | 4/2013 | Tomic et al. |
| 2013/0114599 A1 | 5/2013 | Arad |
| 2013/0114619 A1 | 5/2013 | Wakumoto |
| 2013/0159548 A1 | 6/2013 | Vasseur et al. |
| 2013/0170451 A1 | 7/2013 | Krause et al. |
| 2013/0182604 A1 | 7/2013 | Moreno et al. |
| 2013/0204933 A1 | 8/2013 | Cardona et al. |
| 2013/0208720 A1 | 8/2013 | Ellis et al. |
| 2013/0242745 A1 | 9/2013 | Umezuki |
| 2013/0259033 A1 | 10/2013 | Hefty |
| 2013/0297757 A1 | 11/2013 | Han et al. |
| 2013/0315237 A1 | 11/2013 | Kagan et al. |
| 2013/0322256 A1 | 12/2013 | Bader et al. |
| 2013/0329727 A1 | 12/2013 | Rajagopalan et al. |
| 2013/0336116 A1 | 12/2013 | Vasseur et al. |
| 2013/0336164 A1 | 12/2013 | Yang et al. |
| 2014/0016457 A1 | 1/2014 | Enyedi et al. |
| 2014/0022942 A1 | 1/2014 | Han et al. |
| 2014/0043959 A1 | 2/2014 | Owens et al. |
| 2014/0059440 A1 | 2/2014 | Sasaki et al. |
| 2014/0105034 A1 | 4/2014 | Sun |
| 2014/0140341 A1 | 5/2014 | Bataineh et al. |
| 2014/0169173 A1 | 6/2014 | Naouri et al. |
| 2014/0192646 A1 | 7/2014 | Mir et al. |
| 2014/0198636 A1 | 7/2014 | Thayalan et al. |
| 2014/0211808 A1 | 7/2014 | Koren et al. |
| 2014/0269305 A1 | 9/2014 | Nguyen |
| 2014/0313880 A1 | 10/2014 | Lu et al. |
| 2014/0328180 A1 | 11/2014 | Kim et al. |
| 2014/0343967 A1 | 11/2014 | Baker |
| 2015/0030033 A1 | 1/2015 | Vasseur et al. |
| 2015/0052252 A1 | 2/2015 | Gilde et al. |
| 2015/0092539 A1 | 4/2015 | Sivabalan et al. |
| 2015/0124815 A1 | 5/2015 | Beliveau et al. |
| 2015/0127797 A1 | 5/2015 | Attar et al. |
| 2015/0131663 A1 | 5/2015 | Brar et al. |
| 2015/0163144 A1 | 6/2015 | Koponen et al. |
| 2015/0172070 A1 | 6/2015 | Csaszar |
| 2015/0194215 A1 | 7/2015 | Douglas et al. |
| 2015/0195204 A1 | 7/2015 | Haramaty et al. |
| 2015/0249590 A1 | 9/2015 | Gusat et al. |
| 2015/0295858 A1 | 10/2015 | Chrysos et al. |
| 2015/0372916 A1 | 12/2015 | Haramaty et al. |
| 2016/0012004 A1 | 1/2016 | Arimilli et al. |
| 2016/0014636 A1 | 1/2016 | Bahr et al. |
| 2016/0028613 A1* | 1/2016 | Haramaty .................. H04L 45/14 709/241 |
| 2016/0043933 A1 | 2/2016 | Gopalarathnam |
| 2016/0080120 A1 | 3/2016 | Unger et al. |
| 2016/0080321 A1 | 3/2016 | Pan et al. |
| 2016/0182378 A1 | 6/2016 | Basavaraja et al. |
| 2016/0294715 A1 | 10/2016 | Raindel et al. |
| 2016/0380893 A1 | 12/2016 | Chopra et al. |
| 2017/0054445 A1 | 2/2017 | Wang |
| 2017/0054591 A1 | 2/2017 | Hyoudou et al. |
| 2017/0068669 A1 | 3/2017 | Levy et al. |
| 2017/0070474 A1 | 3/2017 | Haramaty et al. |
| 2017/0180243 A1* | 6/2017 | Haramaty .................. H04L 45/18 |
| 2017/0187614 A1 | 6/2017 | Haramaty et al. |
| 2017/0195758 A1 | 7/2017 | Schrans et al. |
| 2017/0244630 A1 | 8/2017 | Levy et al. |
| 2017/0270119 A1 | 9/2017 | Kfir et al. |
| 2017/0286292 A1 | 10/2017 | Levy et al. |
| 2017/0331740 A1 | 11/2017 | Levy et al. |
| 2017/0358111 A1 | 12/2017 | Madsen |
| 2018/0026878 A1* | 1/2018 | Zahavi .................. H04L 45/38 370/254 |
| 2018/0062990 A1 | 3/2018 | Kumar et al. |
| 2018/0089127 A1 | 3/2018 | Flajslik et al. |
| 2018/0139132 A1 | 5/2018 | Edsall et al. |
| 2018/0302288 A1 | 10/2018 | Schmatz |
| 2020/0042667 A1 | 2/2020 | Swaminathan et al. |
| 2020/0067822 A1 | 2/2020 | Malhotra et al. |
| 2020/0136956 A1 | 4/2020 | Neshat |
| 2022/0014607 A1 | 1/2022 | Pilnik et al. |
| 2022/0045972 A1 | 2/2022 | Aibester et al. |
| 2022/0182309 A1 | 6/2022 | Bataineh et al. |

FOREIGN PATENT DOCUMENTS

| | | |
|---|---|---|
| CN | 110719193 A | 1/2020 |
| CN | 11549927 A | 12/2022 |
| WO | 2012037494 A1 | 3/2012 |
| WO | 2015175567 A1 | 11/2015 |
| WO | 2016014362 A1 | 1/2016 |
| WO | 2016105446 A1 | 6/2016 |

OTHER PUBLICATIONS

Thulasiraman et al., "Logical Topology Augmentation for Guaranteed Survivability Under Multiple Failures in IP-over-WDM Optical Network," 2009 IEEE 3rd International Symposium on Advanced Networks and Telecommunication Systems (ANTS), pp. 1-3, year 2009.

Nastiti et al., "Link Failure Emulation with Dijkstra and Bellman-Ford Algorithm in Software Defined Network Architecture," Abstract of Case Study: Telkom University—Topology, 2018 6th IEEE Conference on Information and Communication Technology (ICoICT), pp. 135-140, year 2018.

Kamiyama et al., "Network Topology Design Considering Detour Traffic Caused by Link Failure," Networks 2008—The 13th International Telecommunications Network Strategy and Planning Symposium, pp. 1-8, year 2008.

Valadarsky et al., "Xpander: Towards Optimal-Performance Datacenters," Proceedings of CoNEXT '16, pp. 205-219, Dec. 2016.

Bilu et al., "Lifts, Discrepancy and Nearly Optimal Spectral Gap," Combinatorica, vol. 26, No. 5, Bolyai Society—Springer-Verlag, pp. 495-519, year 2006.

Leiserson, C E., "Fat-Trees: Universal Networks for Hardware Efficient Supercomputing", IEEE Transactions on Computers, vol. C-34, No. 10, pp. 892-901, Oct. 1985.

Ohring et al., "On Generalized Fat Trees", Proceedings of the 9th International Symposium on Parallel Processing, pp. 37-44, Santa Barbara, USA, Apr. 25-28, 1995.

Zahavi, E., "D-Mod-K Routing Providing Non-Blocking Traffic for Shift Permutations on Real Life Fat Trees", CCIT Technical Report #776, Technion—Israel Institute of Technology, Haifa, Israel, Aug. 2010.

Yuan et al., "Oblivious Routing for Fat-Tree Based System Area Networks with Uncertain Traffic Demands", Proceedings of ACM SIGMETRICS—the International Conference on Measurement and Modeling of Computer Systems, pp. 337-348, San Diego, USA, Jun. 12-16, 2007.

Matsuoka S., "You Don't Really Need Big Fat Switches Anymore—Almost", IPSJ SIG Technical Reports, vol. 2003, No. 83, pp. 157-162, year 2003.

Kim et al., "Technology-Driven, Highly-Scalable Dragonfly Topology", 35th International Symposium on Computer Architecture, pp. 77-78, Beijing, China, Jun. 21-25, 2008.

(56) References Cited

OTHER PUBLICATIONS

Jiang et al., "Indirect Adaptive Routing on Large Scale Interconnection Networks", 36th International Symposium on Computer Architecture, pp. 220-231, Austin, USA, Jun. 20-24, 2009.
Minkenberg et al., "Adaptive Routing in Data Center Bridges", Proceedings of 17th IEEE Symposium on High Performance Interconnects, New York, USA, pp. 33-41, Aug. 25 - 27, 2009.
Kim et al., "Adaptive Routing in High-Radix Clos Network", Proceedings of the 2006 ACM/IEEE Conference on Supercomputing (SC2006), Tampa, USA, Nov. 2006.
Infiniband Trade Association, "InfiniBandTM Architecture Specification vol. 1", Release 1.2.1, Nov. 2007.
Culley et al., "Marker PDU Aligned Framing for TCP Specification", IETF Network Working Group, RFC 5044, Oct. 2007.
Shah et al., "Direct Data Placement over Reliable Transports", IETF Network Working Group, RFC 5041, Oct. 2007.
Martinez et al., "Supporting fully adaptive routing in Infiniband networks", Proceedings of the International Parallel and Distributed Processing Symposium (IPDPS'03),Apr. 22-26, 2003.
Joseph, S., "Adaptive routing in distributed decentralized systems: NeuroGrid, Gnutella & Freenet", Proceedings of Workshop on Infrastructure for Agents, MAS and Scalable MAS, Montreal, Canada, 11 pages, year 2001.
Gusat et al., "R3C2: Reactive Route & Rate Control for CEE", Proceedings of 18th IEEE Symposium on High Performance Interconnects, New York, USA, pp. 50-57, Aug. 10-27, 2010.
Wu et al., "DARD: Distributed adaptive routing datacenter networks", Proceedings of IEEE 32nd International Conference Distributed Computing Systems, pp. 32-41, Jun. 18-21, 2012.
Ding et al., "Level-wise scheduling algorithm for fat tree interconnection networks", Proceedings of the 2006 ACM/IEEE Conference on Supercomputing (SC 2006), 9 pages, Nov. 2006.
Prisacari et al., "Performance implications of remote-only load balancing under adversarial traffic in Dragonflies", Proceedings of the 8th International Workshop on Interconnection Network Architecture: On-Chip, Multi-Chip, 4 pages, Jan. 22, 2014.
Li et al., "Multicast Replication Using Dual Lookups in Large Packet-Based Switches", 2006 IET International Conference on Wireless, Mobile and Multimedia Networks, , pp. 1-3, Nov. 6-9, 2006.
Nichols et al., "Definition of the Differentiated Services Field (DS Field) in the IPv4 and IPv6 Headers", Network Working Group, RFC 2474, 20 pages, Dec. 1998.
Microsoft., "How IPv4 Multicasting Works", 22 pages, Mar. 28, 2003.
Suchara et al., "Network Architecture for Joint Failure Recovery and Traffic Engineering", Proceedings of the ACM SIGMETRICS joint international conference on Measurement and modeling of computer systems, pp. 97-108, Jun. 7-11, 2011.
IEEE 802.1Q, "IEEE Standard for Local and metropolitan area networks Virtual Bridged Local Area Networks", IEEE Computer Society, 303 pages, May 19, 2006.
Plummer, D., "An Ethernet Address Resolution Protocol," Network Working Group ,Request for Comments (RFC) 826, 10 pages, Nov. 1982.
Hinden et al., "IP Version 6 Addressing Architecture," Network Working Group ,Request for Comments (RFC) 2373, 26 pages, Jul. 1998.
Garcia et al., "On-the-Fly 10 Adaptive Routing in High-Radix Hierarchical Networks," Proceedings of the 2012 International Conference on Parallel Processing (ICPP), pp. 279-288, Sep. 10-13, 2012.

Dally et al., "Deadlock-Free Message Routing in Multiprocessor Interconnection Networks", IEEE Transactions on Computers, vol. C-36, No. 5, May 1987, pp. 547-553.
"Equal-cost multi-path routing", Wikipedia, 2 pages, Oct. 13, 2014.
Thaler et al., "Multipath Issues in Unicast and Multicast Next-Hop Selection", Network Working Group, RFC 2991, 9 pages, Nov. 2000.
Glass et al., "The turn model for adaptive routing", Journal of the ACM, vol. 41, No. 5, pp. 874-903, Sep. 1994.
Mahalingam et al., "VXLAN: A Framework for Overlaying Virtualized Layer 2 Networks over Layer 3 Networks", Internet Draft, 20 pages, Aug. 22, 2012.
Sinha et al., "Harnessing TCP's Burstiness with Flowlet Switching", 3rd ACM SIGCOMM Workshop on Hot Topics in Networks (HotNets), 6 pages, Nov. 11, 2004.
Vishnu et al., "Hot-Spot Avoidance With Multi-Pathing Over InfiniBand: An MPI Perspective", Seventh IEEE International Symposium on Cluster Computing and the Grid (CCGrid'07), 8 pages, year 2007.
NOWLAB—Network Based Computing Lab, 2 pages, years 2002-2015 http://nowlab.cse.ohio-state.edu/publications/conf-presentations/2007/vishnu-ccgrid07.pdf.
Alizadeh et al.,"CONGA: Distributed Congestion-Aware Load Balancing for Datacenters", Cisco Systems, 12 pages, Aug. 9, 2014.
Geoffray et al., "Adaptive Routing Strategies for Modern High Performance Networks", 16th IEEE Symposium on High Performance Interconnects (HOTI '08), pp. 165-172, Aug. 26-28, 2008.
Anderson et al., "On the Stability of Adaptive Routing in the Presence of Congestion Control", IEEE INFOCOM, 11 paGes, 2003.
Perry et al., "Fastpass: A Centralized "Zero-Queue" Datacenter Network", M.I.T. Computer Science & Artificial Intelligence Lab, 12 pages, year 2014.
Afek et al., "Sampling and Large Flow Detection in SDN", SIGCOMM '15, pp. 345-346, Aug. 17-21, 2015, London, UK.
Amante et al., "IPv6 Flow Label Specification", Request for Comments: 6437 , 15 pages, Nov. 2011.
Shpigelman et al, U.S. Appl. No. 16/240,749, filed Jan. 6, 2019.
Shpiner et al., "Dragonfly+: Low Cost Topology for Scaling Datacenters", IEEE 3rd International Workshop on High-Performance Interconnection Networks in the Exascale and Big-Data Era (HiPINEB), pp. 1-9, Feb. 2017.
Zahavi et al., "Distributed Adaptive Routing for Big-Data Applications Running on Data Center Networks," Proceedings of the Eighth ACM/IEEE Symposium on Architectures for Networking and Communication Systems, New York, USA, pp. 99-110, Oct. 29-30, 2012.
MELLANOX White Paper, "The SHIELD: Self-Healing Interconnect," pp. 1-2, year 2019.
Cao et al., "Implementation Method for High-radix Fat-tree Deterministic Source-routing Interconnection Network", Computer Science , vol. 39, Issue 12, pp. 33-37, 2012.
Yallouz et al., U.S. Appl. No. 17/016,464, filed Sep. 10, 2020.
Levi et al., U.S. Appl. No. 17/079,543, filed Oct. 26, 2020.
U.S. Appl. No. 17/079,543 Office Action dated Mar. 16, 2022.
EP Application # 21204582.7 Search Report dated Mar. 18, 2022.
U.S. Appl. No. 17/016,464 Office Action dated May 10, 2022.
Cisco, "Cisco ACI Remote Leaf Architecture—White Paper," pp. 1-83, Jan. 22, 2020.
U.S. Appl. No. 17/539,252 Office Action dated Apr. 26, 2023.
Zhao et al., "Recovery Strategy from Network Multi-link Failures Based on Overlay Network Constructing Technique," Bulletin of Science and Technology, vol. 32, No. 10, pp. 170-239, Oct. 2016.
CN Application # 202210593405.5 Office Action dated Sep. 15, 2023.

* cited by examiner

DEADLOCK-FREE LOCAL REROUTING FOR HANDLING MULTIPLE LOCAL LINK FAILURES IN HIERARCHICAL NETWORK TOPOLOGIES

FIELD OF THE INVENTION

The present invention relates generally to communication networks, and particularly to methods and systems for rerouting network traffic in cases of link failure.

BACKGROUND

Communication networks used in applications such as High-Performance Computing (HPC) systems and datacenters typically comprise a large number of network elements interconnected by links. A high-reliability communication network should be able to recover quickly from link failure events.

Methods for recovery from link failures are known in the art. For example, a white paper by Mellanox® Technologies (2018) describes a solution called SHIELD™ (Self-Healing Interconnect Enhancement for Intelligent Datacenters), which takes advantage of the intelligence already built into the latest generation of InfiniBand switches. By making the fabric capable of self-healing autonomy, the speed with which communications can be corrected in the face of a link failure can be sped up by 5000×, fast enough to save communications from expensive retransmissions or absolute failure.

Aspects of the SHIELD solution are described, for example, in U.S. Pat. No. 9,729,473, which describes a method in a network element that includes multiple interfaces for connecting to a communication network. The method includes receiving via an ingress interface packets that are not allowed to undergo re-routing and that are addressed to a destination via a first egress interface. The packets are forwarded via the first egress interface when there is a valid path from the first egress interface to the destination. When there is no valid path from the first egress interface to the destination, a second egress interface is selected from a group of multiple egress interfaces that have respective paths to the destination and are assigned to packets for which re-routing is allowed, and the packets are forwarded via the second egress interface until recovering a path to the destination.

U.S. Pat. No. 9,137,143 describes a multiprocessor computer system comprising a dragonfly processor interconnect network that comprises a plurality of processor nodes and a plurality of routers. The routers are operable to adaptively route data by selecting from among a plurality of network paths from a target node to a destination node in the dragonfly network based on one or more of network congestion information from neighboring routers and failed network link information from neighboring routers.

SUMMARY

Embodiments of the present invention that are described hereinbelow provide improved methods and systems for rerouting network traffic in cases of link failure.

There is therefore provided, in accordance with an embodiment of the invention, a method for communication, which includes configuring primary routes for delivery of data packets in a network including multiple subnetworks interconnected by trunk links. Each subnetwork includes multiple switches, which are configured to communicate via at least first and second virtual lanes and are arranged in a bipartite topology including an upper tier containing upper-tier switches, which are connected to one or more of the trunk links, and a lower tier containing lower-tier switches, which are connected by local links to the upper-tier switches. The local links in each subnetwork are partitioned into at least first and second groups.

For each local link that is a part of one or more of the primary routes and connects a first upper-tier switch to a first lower-tier switch in a given subnetwork, a corresponding detour route is defined, passing through a first local link belonging to the first group from the first upper-tier switch to a second lower-tier switch within the given subnetwork, and from the second lower-tier switch over a second local link to a second upper-tier switch in the given subnetwork, and from the second upper-tier switch over a third local link belonging to the second group to the first lower-tier switch. Upon a failure of the local link connecting the first upper-tier switch to the first lower-tier switch, the data packets arriving at the first upper-tier switch for transmission to the first lower-tier switch are rerouted so that the data packets pass through the corresponding detour route to the first lower-tier switch, while transmitting the data packets over the second and third local links via the second virtual lane.

In some embodiments, the lower-tier switches include leaf switches, and the method includes delivering the data packets received in the given subnetwork via the detour route to a network end-node that is connected to the first lower-tier switch.

Additionally or alternatively, partitioning the links in each subnetwork includes defining a third group of the links, wherein defining the corresponding detour route includes configuring detour routes through the first and second groups of the links for the data packets that are destined for network end-nodes that are connected to the given subnetwork, and wherein the method includes defining at least one dive-through route over which a data packet enters the subnetwork via the first virtual lane through a first trunk link to one of the upper-tier switches in the subnetwork, passes through one of the links in the third group to one of the lower-tier switches in the subnetwork and through another one of the links via the second virtual lane to another one of the upper-tier switches in the subnetwork, from which the data packet exits the subnetwork through a second trunk link.

In a disclosed embodiment, defining the corresponding detour route includes defining multiple detour routes for use in case of failures of multiple ones of the local links in the given subnetwork.

In some embodiments, defining the corresponding detour route includes, for any given local link, applying the corresponding detour route in rerouting the data packets arriving in the given subnetwork over any of a plurality of the primary routes of which the given local link is a part, such that the primary routes continue to pass through the first upper-tier switch notwithstanding failures of the given local link. In a disclosed embodiment, configuring the primary routes includes defining an adaptive routing group including the primary routes that are destined to the given subnetwork irrespective of the lower-tier switches to which the primary routes are directed, such that upon failures of any of the local links within the given subnetwork, the primary routes in the adaptive routing group are rerouted over detour routes within the given subnetwork.

There is also provided, in accordance with an embodiment of the invention, a communication system, which includes a network including multiple subnetworks interconnected by trunk links. Each subnetwork includes multiple switches, which are configured to communicate via at least first and second virtual lanes and are arranged in a bipartite topology including an upper tier containing upper-tier switches, which are connected to one or more of the trunk links, and a lower tier containing lower-tier switches, which are connected by local links to the upper-tier switches. A management processor is configured to define primary routes for delivery of data packets in the network, to partition the local links in each subnetwork into at least first and second groups, and for each local link that is a part of one or more of the primary routes and connects a first upper-tier switch to a first lower-tier switch in a given subnetwork, to define a corresponding detour route passing through a first local link belonging to the first group from the first upper-tier switch to a second lower-tier switch within the given subnetwork, and from the second lower-tier switch over a second local link to a second upper-tier switch in the given subnetwork, and from the second upper-tier switch over a third local link belonging to the second group to the first lower-tier switch. The switches in the given subnetwork are configured, upon a failure of the local link connecting the first upper-tier switch to the first lower-tier switch, to reroute the data packets arriving at the first upper-tier switch for transmission to the first lower-tier switch so that the data packets pass through the corresponding detour route to the first lower-tier switch, while transmitting the data packets over the second and third local links via the second virtual lane.

There is additionally provided, in accordance with an embodiment of the invention, a method for communication, which includes partitioning local links in a subnetwork of a packet data network into at least first and second groups. For each local link that connects a first upper-tier switch to a first lower-tier switch in the subnetwork, a corresponding detour route is defined, passing through a first local link belonging to the first group from the first upper-tier switch to a second lower-tier switch, and from the second lower-tier switch over a second local link to a second upper-tier switch, and from the second upper-tier switch over a third local link belonging to the second group to the first lower-tier switch. Upon a failure of the local link connecting the first upper-tier switch to the first lower-tier switch, data packets arriving from the network at the first upper-tier switch for forwarding over the local link are rerouted so that the data packets pass via the corresponding detour route to the first lower-tier switch.

In a disclosed embodiment, rerouting the data packets includes receiving the data packets from the network, and forwarding the data packets via a specified virtual lane from the second lower-tier switch over the second local link to the second upper-tier switch.

There is further provided, in accordance with an embodiment of the invention, method for communication, which includes configuring primary routes for delivery of data packets in a network including multiple subnetworks interconnected by trunk links. Each subnetwork includes multiple switches in a bipartite topology including an upper tier containing upper-tier switches, which are connected to one or more of the trunk links, and a lower tier containing lower-tier switches, which are connected by local links to the upper-tier switches. For any given local link that is a part of one or more of the primary routes and connects a first upper-tier switch to a first lower-tier switch in a given subnetwork, a corresponding detour route is defined, passing through the local links within the given subnetwork from the first upper-tier switch to a second lower-tier switch, and from the second lower-tier switch to a second upper-tier switch and from the second upper-tier switch to the first lower-tier switch. When the given local link is a part of a plurality of the primary routes, the corresponding detour route is applied to all of the plurality of the primary routes of which the given local link is a part, such that the primary routes continue to pass through the first upper-tier switch notwithstanding failures of the given local link. Upon a failure of the local link connecting the first upper-tier switch to the first lower-tier switch, the data packets arriving at the first spine switch in the given subnetwork are rerouted to pass via the corresponding detour route to the first lower-tier switch.

In a disclosed embodiment, configuring the primary routes includes defining an adaptive routing group including the primary routes that are destined to the given subnetwork irrespective of the lower-tier switches to which the primary routes are directed, such that upon failures of any of the local links within the given subnetwork, the primary routes in the adaptive routing group are rerouted over detour routes within the given subnetwork.

The present invention will be more fully understood from the following detailed description of the embodiments thereof, taken together with the drawings in which:

DETAILED DESCRIPTION OF EMBODIMENTS

Overview

When a link in a packet data network fails, packets that would normally be forwarded via this link may be dropped until an alternative path to the destination is established. In principle, a central entity in the network may detect or be notified of a failed link and may then reconfigure one or more of the network elements to create an alternative path to the destination. Centralized recovery methods of this sort, however, react too slowly for the needs of high-performance, high-speed networks.

U.S. patent application Ser. No. 17/016,464, filed Sep. 10, 2020, whose disclosure is incorporated herein by reference, describes methods and systems for recovering from link failures in a network using predefined local detour paths. This approach provides a fast recovery mechanism, and the detour path can remain in use until the link is fixed or until a central entity reconfigures an alternative path. The techniques described in this patent application are particularly applicable, for example, to topologies comprising interconnected groups of switches (or other network elements) having bipartite topologies, in which the switches are arranged in upper and lower tiers, which are connected by a mesh of local links. In such a topology, for example, the switches may include a lower tier of leaf switches, which connect to end-nodes of the network, and an upper tier of spine switches, which are connected by trunk links to the other groups.

In lossless networks, rerouting of packets in response to link failures can give rise to problems of deadlock due to flow control loops. Lossless networks typically apply flow control techniques to prevent buffer overfill and packet drop events. Rerouting in such networks, however, may result in buffers of multiple switches interconnected cyclically becoming full, preventing these switches from further sending or receiving packets. This sort of condition is referred to as a "deadlock condition" or simply "deadlock." One way to avoid deadlock is to transmit packets over multiple virtual lanes (VLs) on each link, but this approach requires that the switches have large memories in order to allocate sufficient buffer space for all the virtual lanes. To optimize the use of memory resources, it is generally desirable that only a small number of virtual lanes be used throughout the network, for example two virtual lanes.

In response to this problem, the above-mentioned U.S. patent application Ser. No. 17/016,464 describes a deadlock-free solution that can be applied by the switches in a bipartite group in case of a local link failure: The packets are rerouted to their destination switch via a detour path, which includes a detour link that delivers packets in a spine-to-leaf direction and another detour link that delivers packets in a leaf-to-spine direction within the group. This solution is capable of handling any single link failure within any given group of switches without requiring that more than two virtual lanes be used throughout the network.

Embodiments of the present invention that are described herein extend this solution to cover the possibility of multiple local link failures within a bipartite group of switches. These embodiments are applicable particularly to networks comprising multiple subnetworks interconnected by trunk links, each subnetwork comprising multiple switches arranged in a bipartite topology. A management processor (for example, a computer processor performing the function of a subnet manager) configures primary routes, over which packets are delivered through the network from a given source to a given destination, and detour routes for use in case of failures of the primary routes.

To define the detour routes, the management processor partitions the local links in each subnetwork into at least two groups. For each local link that is a part of one or more of the primary routes and connects a given upper-tier switch to a given lower-tier switch in one of the subnetworks, the corresponding detour route passes from the given upper-tier switch to a second lower-tier switch within the subnetwork through a first local link belonging, for example, to the first of the two groups. The route then passes from this second lower-tier switch over a second local link (which may belong to either of the groups) to a second upper-tier switch in the subnetwork, and from the second upper-tier switch over a third local link belonging to the second group to the original, given lower-tier switch.

Upon a failure of a local link, between a certain upper-tier switch and a certain lower-tier switch, for which a detour route of this sort has been defined, the switches in the subnetwork reroute data packets arriving at the given upper-tier switch to pass through the corresponding detour route to the lower-tier switch. Assuming that the packets arrive at the upper tier switch via a first virtual lane (for example from a trunk link on VL0), over which packets are transmitted from their source nodes through the network, the switches will transmit the data packets over the second and third local links of the detour route via a different, second virtual lane (VL1 in this example). It can be shown that this scheme will operate without deadlocks, using only two virtual lanes, even when multiple local links in a given subnetwork fail simultaneously. Specifically, in a bipartite subnetwork having n switches in each of the upper and lower tiers, the number of local link failures that can be handled by the present detour routes is n/2−1.

In some embodiments of the present invention, advance definition of detour routes for the local links in each subnetwork is used in defining adaptive routing (AR) groups over the entire network. For this purpose, as explained above, the management processor defines a corresponding detour route for each local link (between a certain upper-tier switch and a certain lower-tier switch in a given subnetwork) that is a part of one or more primary routes in the network. When a given local link is a part of multiple primary routes, the corresponding detour route is applied to all of these primary routes. Thus, these primary routes continue to pass through the same upper-tier switch in the subnetwork notwithstanding failures of the given local link.

Using this scheme, the management processor can define an AR group comprising the primary routes that are destined to any given subnetwork irrespective of the lower-tier switches through which the primary routes pass. Upon failures of any of the local links within the given subnetwork, the primary routes in the adaptive routing group are rerouted over the corresponding detour routes within the given subnetwork. Thus, the switches outside any given subnetwork need not even be informed of local link failures in the subnetwork and continue to transmit packets along the primary routes irrespective of such failures, since local link failures are handled internally within the subnetworks. This approach is useful in conserving memory in the switches and reducing the need for inter-switch failure notifications.

System Description

Figure 1A:
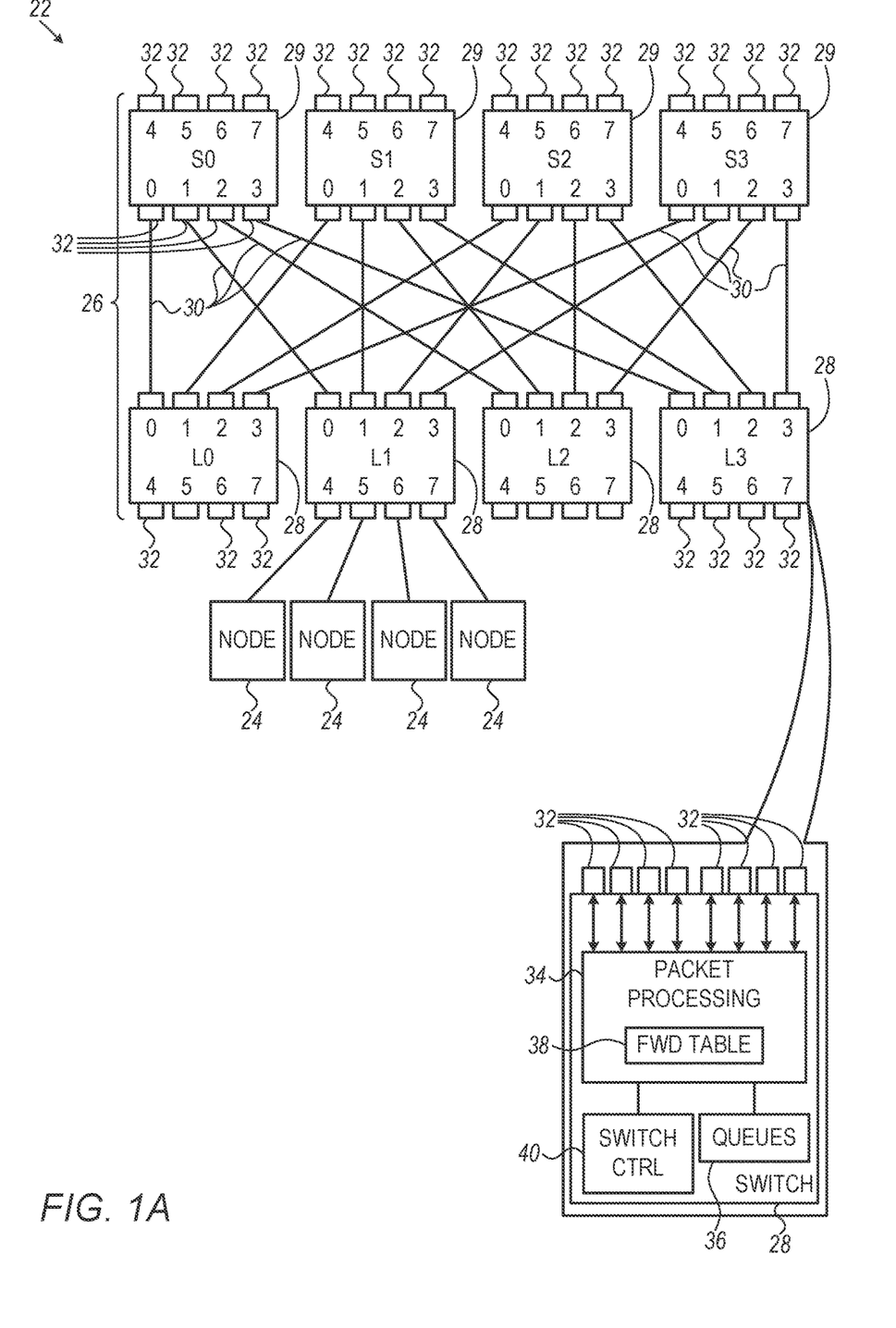
FIG. 1A is a block diagram that schematically illustrates a multi-level subnetwork, in accordance with an embodiment of the invention.
Figure 1B:
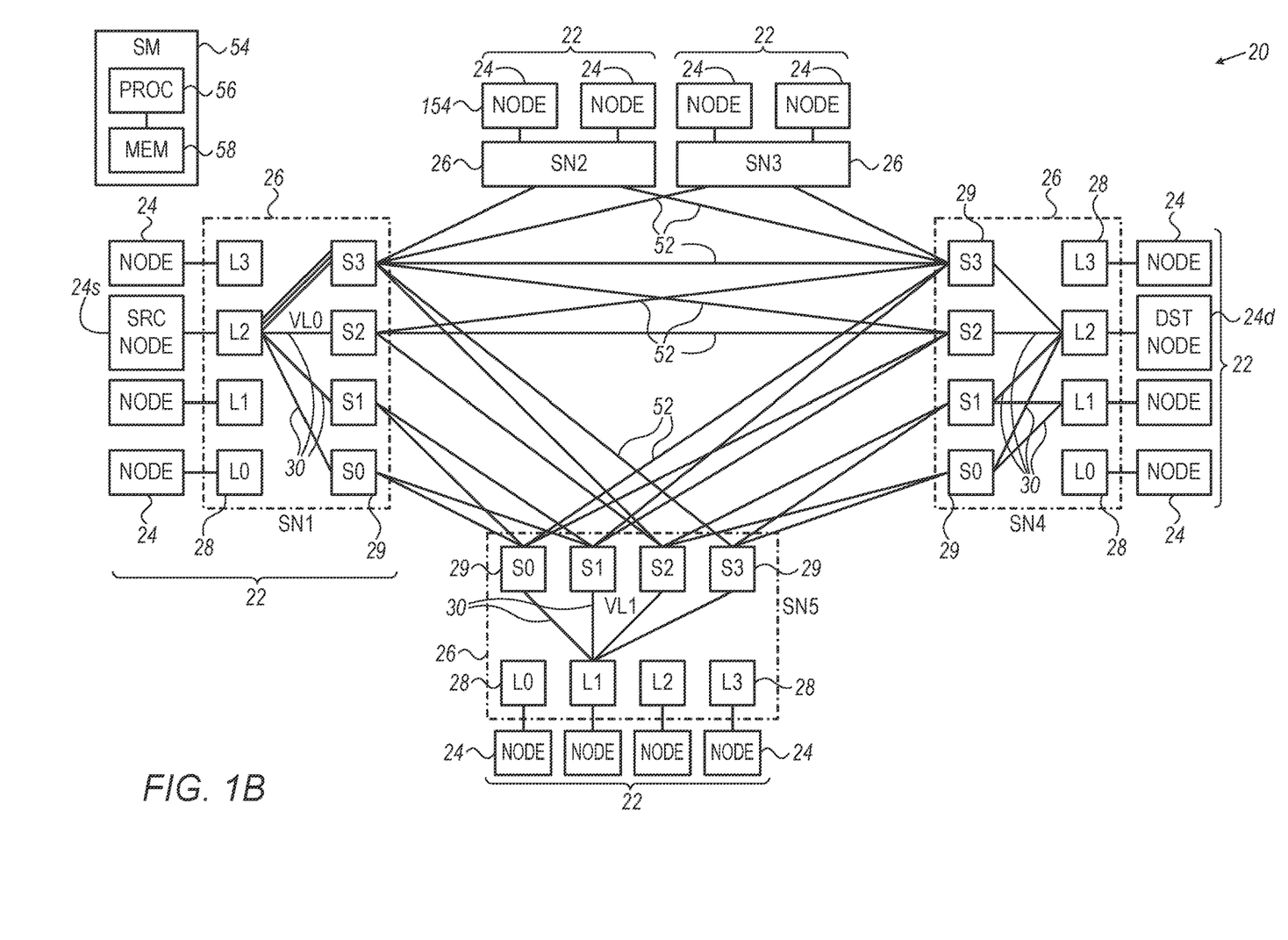
FIG. 1B is a block diagram of a hierarchical packet communication network comprising interconnected multiple subnetworks, in accordance with an embodiment of the invention.

Reference is now made to FIGS. 1A and 1B, which are block diagrams that schematically illustrate a communication system 20 in which a network recovers from link failures using deadlock-free detour paths, in accordance with an embodiment of the invention. System 20 comprises multiple subsystems 22, each comprising a respective subnetwork 26, one of which is shown in detail in FIG. 1A. Subnetworks 26 are labeled SN1 . . . SN5 in FIG. 1B and are interconnected by trunk links 52. Network end-nodes 24, such as host computers, in system 20 communicate with one another over local links 30 within each subnetwork 26 and trunk links 52 between the subnetworks. For the sake of simplicity, system 20 is shown as including only five subnetworks, with eight switches arranged in two tiers in each subnetwork. In practice, however, the methods described herein can be applied in much larger networks, with greater numbers of subnetworks and more switches in each subnetwork.

As shown in FIG. 1A, each subnetwork 26 is arranged in a bipartite topology, including lower-tier switches 28 and upper-tier switches 29, which are connected to the lower-tier switches by a mesh of local links 30. In the pictured example, lower-tier switches 28 are identified as leaf switches, which are denoted L0 . . . L3 and are connected to respective end-nodes 24; while upper-tier switches 29 are identified as spine switches and denoted S0 . . . S3. End-nodes 24 are connected only to the leaf switches, while the spine switches are connected only to the leaf switches and to trunk links 52. In the description that follows, switches 28 and 29 may be referred to simply as "leaves" and "spines," respectively, for the sake of brevity. The principles of the present invention, however, are by no means limited to this specific sort of bipartite topology and may alternatively be applied to any bipartite pair of tiers in a hierarchical subnetwork that includes two or more such tiers.

In the example of FIG. 1A, switches 28 and 29 are interconnected in a fully connected bipartite topology, i.e., each upper-tier switch 29 connects to all lower-tier switches 28, and each lower-tier switch connects to all upper-tier switches. A bipartite topology of this sort can also be viewed as a two-level Fat-Tree (FT) topology or two adjacent levels in a multi-level FT topology.

The topology is defined as "bipartite" because it is analogous to a bipartite graph, meaning a graph in which the vertices are partitioned into two sets, and every edge in the graph has an endpoint in each of the two sets. In the present context, a bipartite topology comprises multiple upper-tier switches and multiple lower-tier switches. Each upper-tier switch is connected to one or more lower-tier switches, and each lower-tier switch is connected to one or more upper-tier switches, but upper-to-upper and lower-to-lower links are not allowed. A bipartite topology is referred to as "fully connected" when each upper-tier switch connects to all lower-tier switches, and vice versa. In general, however, a bipartite topology is not necessarily fully connected.

In the present embodiment and in the description that follows, subnetwork 26 comprise switches 28 and 29. As shown in the inset in FIG. 1A, each switch 28 comprises multiple ports 32, a packet processor 34, and a memory 36, for example for storing packets in queues while awaiting transmission. Switches 29 (not shown in the inset) are of similar construction. The switch connects via ports 32 to other switches and/or to network end-nodes 24. In FIG. 1A, four ports of each switch that are used for inter-tier connections are within subnetwork 26 are numbered 0 . . . 3, while four ports used for external connections are numbered 4 . . . 7. The term "switch" is used in the present description and in the claims to refer broadly to network elements having multiple ports and capabilities of switching data packets among the parts. Other network elements with these features, such as routers and bridges, are also considered to be "switches" in the present context.

Each port 32 serves both as an ingress port for receiving packets from another switch or from a network end-node, and as an egress port for transmitting packets to another switch or to a network end-node. Ports 32 typically comprise hardware circuit components capable of performing physical layer (PHY) and media access control (MAC) interface functions, as are known in the art.

Packet processor 34 applies various processing operations to packets received via ports 32, such as verification, filtering, prioritization, and forwarding. These processing operations may also include modifying the Virtual Lane (VL) with which the packets are associated. As noted earlier, switches 28, 29 support at least two virtual lanes (VL0 and VL1) and may support a larger number of virtual lanes. Typically, packet processor 34 comprise hard-wired and/or programmable hardware logic circuits, which are configured to carry out the functions described herein at high speed. Additionally or alternatively, at least some of the functions of packet processor 34 may be implemented in software on a suitable programmable processing core.

Packet processor 34 performs packet forwarding using a forwarding table 38, based, for example, on source and destination addresses carried in the packet headers. Using the forwarding table, the switch determines the egress port for each received packet. Switch 28 stores received packets that have been processed and await transmission in queues in memory 36. In alternative embodiments, other packet processing and forwarding methods, such as Access Control Lists (ACLs), can also be used.

Switch 28 comprises a switch controller 40, typically comprising a programmable processor, which is programmed in software to carry out the functions that are described herein. Among other tasks, switch controller 40 updates forwarding table 38 to include detour paths that can be used to resolve network malfunctions due to link failures. Typically these detour paths are defined by a management processor, such as a programmable processor 56 in a subnet manager (SM) 54 (FIG. 1B) in system 20. Additionally or alternatively, the detour paths may be defined by another entity in system 20, for example by interaction among switches 28, 29 in each subnetwork 26, in communication with SM 54 or independently.

SM 54 typically comprises processor 56 and a memory and may be configured as a standalone device, with communication links to switches 28 and 29, or may be integrated into one of the switches or other components of system 20. Although SM 54 is shown in FIG. 1B as a single physical entity, the functions of SM 54 may alternatively be distributed among multiple processing units in system 20. SM 54 carries out the routing and fault-handling functions that are described herein, along with other management functions that are known in the art, under the control of suitable software. This software may be provided to SM 54 in electronic form, for example over a network. Alternatively or additionally, the software may be stored on tangible, non-transitory computer-readable media, such as electronic, optical, or magnetic memory media.

As noted above, switch controller 40 stores one or more predefined detour paths, which are defined by a management processor, such as processor 56 in SM 54, using the methods that are described herein. Upon a link failure, switch controller 40 directs traffic to an alternative port leading to the respective detour path. In other embodiments, switch controller 40 communicates with other switches in network 26 for selecting a detour path, and applies the selected detour path by updating forwarding table 38. Additionally or alternatively, upon detecting a failure of one of local links 30, switch controller 40 notifies subnet manager 54, so that the subnet manager can take appropriate action in rerouting in the network to circumvent the failed link. The use of the detour route in the meanwhile ensures that there will be little or no interruption of packet traffic in the network while the processes of failure notification and rerouting are going on. Once the new routes have been established, the detour route may no longer be required.

In FIG. 1B, a network end-node 24s, referred to as a source node and labeled "SRC node," sends packets over its local subnetwork 26 (SN1) to a destination end-node 24d, denoted "DST node," in another subnetwork 26 (SN4). SM 54 configures a primary route for this packet flow, for example a three-hop route beginning with local link 30 from L2 to S2 within SN1, then via trunk link 52 to S2 in SN4, and via local link 30 to L2 in SN4, which delivers the data packets to the DST node.

By convention, switch L2 in SN1 transmits the packets from their source node on VL0. This choice is arbitrary, and any virtual lane can be used for transmission of packets from their source. To ensure deadlock-free operation while conserving virtual lanes (and thus conserving memory resources), however, it is desirable that the same virtual lane, such as VL0, be used for transmission of all data packets from their respective source nodes in the source subnetwork. Switchover to a second virtual lane, such as VL1, within subnetworks 26 takes place when appropriate, specifically when the packet is forwarded by an upper-tier switch 29 from one trunk link 52 to another or is forwarded within a subnetwork from a lower-tier switch to an upper-tier switch, as described further hereinbelow.

Alternatively or additionally, SM 54 may define a four-hop route, for example via one of upper-tier switches in SN5, or a six-hop "dive-through" route, passing through upper-tier switches 29 and one of lower-tier switches 28 in SN5. (Such routes may similarly be defined through other subnetworks, such as SN2 and SN3. Each "hop" corresponds to a single link on the path of the packet to its destination.) In the dive-through route, for example, data packets transmitted from SRC node 24s through switch L2 are conveyed through a first trunk link 52 to one of upper-tier switches 29 in SN5, for example from S1 in SN1 to S0 in SN5. The packets thus enter SN5 and pass through local links 30 from S0 to one of lower-tier switches 28, such as switch L1 in SN5, and then through another one of the local links 30 to another one of the upper-tier switches, for example to switch S3 is SN5. The data packets are transmitted from SN1 and enter SN5 on VL0, but for purposes of deadlock avoidance, switch L1 in SN5 transmits the packets onward using VL1. The data packets exit SN5 on VL1 through a second trunk link 52, for example from switch S3 is SN5 to switch S1 in SN4. This switch then transmits the packets over local link 30 to switch L2, which passes the packets to DST end-node 24d. Details of the criteria applied by SM 54 is defining dive-through routes of this sort are described further hereinbelow with reference to FIG. 4.

Defining and Applying Detour Routes

Figure 2:
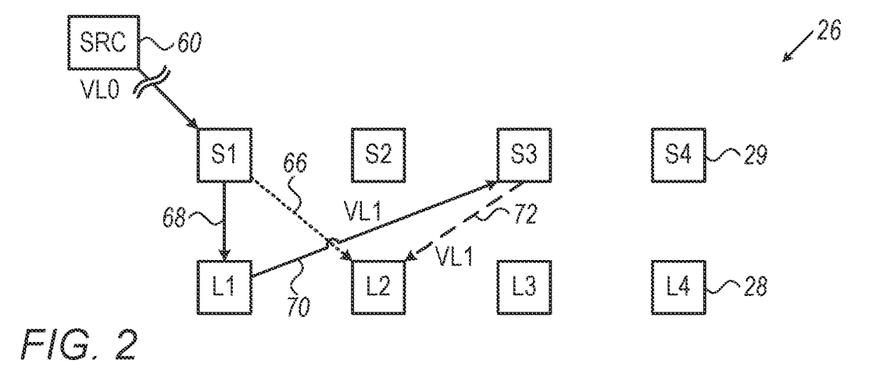
FIG. 2 is a block diagram that schematically illustrates establishment of a detour route following a link failure in a multi-level subnetwork, in accordance with an embodiment of the invention.
Figure 3:
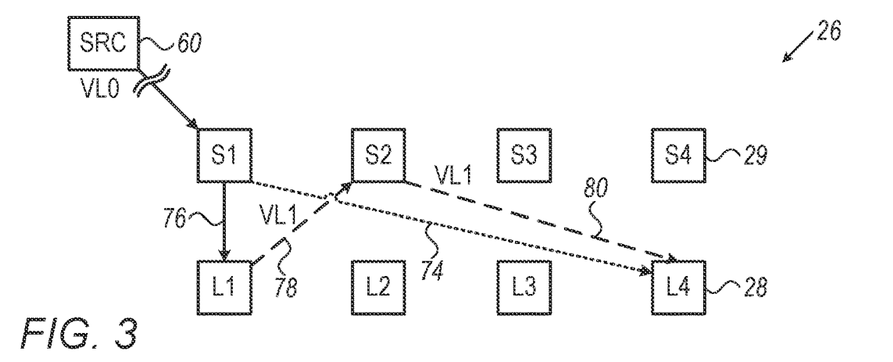
FIG. 3 is a block diagram that schematically illustrates establishment of a detour route following a link failure in a multi-level subnetwork, in accordance with another embodiment of the invention.

FIGS. 2 and 3 are block diagrams that schematically illustrates establishment of detour routes following a link failure in one of subnetworks 26, in accordance with embodiments of the invention. SM 54 defines a corresponding detour route of this sort for each local link 30 in any given subnetwork 26 that is a part of one or more of the primary routes in a network, such as the routes described above between source node 24s and destination node 24d in system 20. FIGS. 2 and 3 show two variants on the same principles of definition of these detour routes, with different choices of the middle link in the routes, as explained below.

Figure 4:
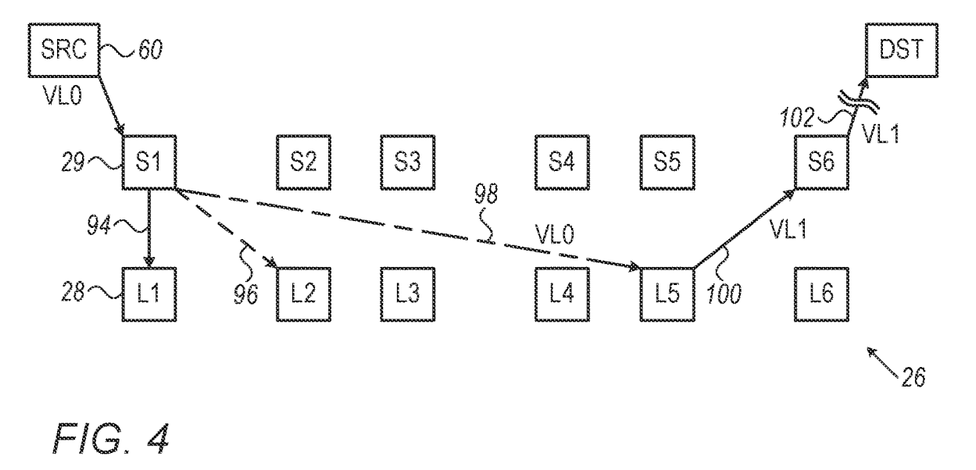
FIG. 4 is a block diagram that schematically illustrates establishment of a "dive-through" route in a multi-level subnetwork, in accordance with an embodiment of the invention.

To ensure that the detour routes will be deadlock-free, SM 54 partitions local links 30 into two groups. In FIGS. 2-4, local links in one of the groups (referred to arbitrarily as the first group) are represented by solid arrows, while those in the other (second) group are represented by dashed arrows. It can be useful to define the two groups to contain roughly equal numbers of the local links, with the links in each group connecting to most or all of switches 28 and 29. Alternatively, other groupings may be used.

Referring now to FIG. 2, a primary route from a source node 60 in another subnetwork passes through an upper-tier switch S1 in subnetwork 26 to a lower-tier switch L2, via a local link 66. (The primary route then typically passes from switch L2 to a destination end-node, as shown in FIG. 1B, for example.) For each such local link, SM 54 (FIG. 1B) defines a corresponding detour route using links from both of the groups of local links. In the example shown in FIG. 2, the detour route passes through a first local link 68 belonging to the first group, connecting the first upper-tier switch S1 to a different lower-tier switch L1 within subnetwork 26, and then from this lower-tier switch over a second local link 70 to a second upper-tier switch S3. In the present example, local link 70 belongs to the first group, as well. The detour route then passes from this second upper-tier switch S3 over a third local link 72 belonging to the second group to the original lower-tier switch L2.

In the scenario shown in FIG. 2, link 66 has failed. Therefore, when packets on a primary route that included link 66 enter subnetwork 26, switch S1 reroutes the packets over the detour route defined above, via links 68, 70 and 72. The packets may arrive at switch S1 on either VL0 or VL1. In either case, however, to ensure deadlock-free operation, switches L1 and S3 will transmit the packets over the second and third local links of the detour route (links 70 and 72) via VL1.

Typically, SM 54 defines multiple detour routes for use in case of failures of different local links in subnetwork 26. Two or more of these detour routes can be used concurrently when multiple link failures occur simultaneously in the subnetwork.

As another example, FIG. 3 shows a detour route for use in case of failure of a local link 74 from upper-tier switch S1 to lower-tier switch L4. The detour route includes a first local link 76 from switch S1 to switch L1 within subnetwork 26, and then a second local link 78 to a second upper-tier switch S2 and a third local link 80 to the original lower-tier switch L4. Local link 76 belongs to the first group of links, while local links 78 and 80 belong to the second group. As in FIG. 2, the packets are transmitted over links 78 and 80 using VL1.

Any given local link in a given subnetwork 26, such as links 66 and 74 in FIGS. 2 and 3, can typically be a part of multiple different primary routes through system 20 that terminate at destination nodes that are connected to this subnet. For example, local link 66 may be a part of multiple primary routes that connect various source nodes 24 in SN1, as well as in SN5 (and other subnetworks), to destination nodes that are connected to switch L2 in SN4. In such cases, switch S1 will apply the detour route that is shown in FIG. 2 in rerouting the data packets arriving in subnetwork 26 over any of the primary routes of which local link 66 is a part. Thus, the primary routes will continue to pass through the same upper-tier switch S1 notwithstanding failures of local link 66.

Rerouting of the packets within subnetwork 26 in this manner is transparent to the other subnetworks in system 20. Switches 28, 29 in this subnetwork will notify SM 54 of the failure, and SM 54 will typically respond by updating forwarding tables 38 (FIG. 1A) of the switches within the subnetwork. Until this update takes place, however, traffic on all the applicable primary routes is transmitted without interruption over the detour route.

This application of preconfigured detour routes is also useful in simplifying the adaptive routing information that is provided to the switches in system 20 and thus in reducing the volume of memory that the switches must use to store this adaptive routing information. For this purpose, SM 54 defines adaptive routing groups in system 20. Each such group comprises the primary routes that are destined to a given subnetwork, irrespective of the lower-tier switches (i.e., the leaf switches in the present example) within the subnetwork to which the primary routes are directed. Upon failures of any of the local links within the given subnetwork, the primary routes in the adaptive routing group will be rerouted over detour routes within the given subnetwork.

Fault routing information is saved for each adaptive routing group to prevent sending data packets toward failed links. Since local failures are handled locally inside each subnetwork, the fault routing information is correct for the entire subnetwork, thus enabling the adaptive routing group information to be stored per subnetwork, rather than per destination leaf switch. When adaptive routing groups of this sort are defined with respect to the primary routes that terminate in a given subnetwork, switches in other subnetworks need not be aware at all of the lower-tier switches within the given subnetwork that take part in detour routing. There is thus no need for adaptive routing information to be stored by switches in other subnetworks with respect to the leaf switches through which the primary routes reach their destinations in the given subnetwork. This adaptive routing solution is a useful adjunct to the particular detour routing schemes that are described above; but it may alternatively be applied in conjunction with other methods for defining detour paths within subnetworks, such as the methods defined in the above-mentioned U.S. patent application Ser. No. 17/016,464.

FIG. 4 is a block diagram that schematically illustrates a "dive-through" route in subnetwork 26, in accordance with another embodiment of the invention. For purposes of dive-through routing, SM 54 partitions the local links in the subnetwork to define a third group, in addition to the first and second groups that are used in defining detour paths for data packets that are destined for network end-nodes in subnetwork 26. In the present example, the first group of links includes a local link 94, indicated by a solid arrow, and the second group includes a local link 96, indicated by a dashed arrow. A local link 98 in the third group is indicated by a dash-dot arrow. SM 54 can choose the number of links to include in the third group, for example based on the volume of dive-through traffic that is expected to traverse subnetwork 26.

The dive-through route shown in FIG. 4 is used for forwarding of data packets transmitted from source node 60 over one of trunk links 52 (FIG. 1B) to an upper-tier switch S1 in subnetwork 26. The packets are assumed to arrive on VL0. The dive-through route passes through link 98 in the third group to a lower-tier switch L5 in subnetwork 26, and from switch L5 through another link 100 to another one of the upper-tier switches S6. To prevent deadlocks, switch L5 transmits the packet over link 100 on VL1, and switch S6 forwards the packet on this same virtual lane out of subnetwork 26 through another trunk link 102 to the destination subnetwork. Link 100 may belong to any of the groups of local links.

Although the embodiments shown in FIGS. 2-4 rely on partitioning of the links in a subnetwork for the purpose of defining deadlock-free detour routes, other partitioning schemes may alternatively to be used for this purpose, mutatis mutandis. For example, switches 28 and 29 in a given subnetwork may be partitioned into two or three groups to serve as the basis for defining detour routes between the groups. As another alternative, the ports of each switch may be partitioned between the groups.

Documents incorporated by reference in the present patent application, and specifically the above-mentioned U.S. patent application Ser. No. 17/016,464, are to be considered an integral part of the application except that to the extent any terms are defined in these incorporated documents in a manner that conflicts with the definitions made explicitly or implicitly in the present specification, only the definitions in the present specification should be considered.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
configuring primary routes for delivery of data packets in a network comprising multiple subnetworks interconnected by trunk links, each subnetwork comprising multiple switches, which are configured to communicate via at least first and second virtual lanes and are arranged in a bipartite topology comprising an upper tier containing upper-tier switches, which are connected to one or more of the trunk links, and a lower tier containing lower-tier switches, which are connected by local links to the upper-tier switches;
partitioning the local links in each subnetwork into at least first and second groups;
for each local link that is a part of one or more of the primary routes and connects a first upper-tier switch to a first lower-tier switch in a given subnetwork, defining a corresponding detour route passing through a first local link belonging to the first group from the first upper-tier switch to a second lower-tier switch within the given subnetwork, and from the second lower-tier switch over a second local link to a second upper-tier switch in the given subnetwork, and from the second upper-tier switch over a third local link belonging to the second group to the first lower-tier switch; and
upon a failure of the local link connecting the first upper-tier switch to the first lower-tier switch, rerouting the data packets arriving at the first upper-tier switch for transmission to the first lower-tier switch so that the data packets pass through the corresponding detour route to the first lower-tier switch, while transmitting the data packets over the second and third local links via the second virtual lane.

2. The method according to claim 1, wherein the lower-tier switches comprise leaf switches, and the method comprises delivering the data packets received in the given subnetwork via the detour route to a network end-node that is connected to the first lower-tier switch.

3. The method according to claim 1, wherein partitioning the links in each subnetwork comprises defining a third group of the links,
wherein defining the corresponding detour route comprises configuring detour routes through the first and second groups of the links for the data packets that are destined for network end-nodes that are connected to the given subnetwork, and
wherein the method comprises defining at least one dive-through route over which a data packet enters the subnetwork via the first virtual lane through a first trunk link to one of the upper-tier switches in the subnetwork, passes through one of the links in the third group to one of the lower-tier switches in the subnetwork and through another one of the links via the second virtual lane to another one of the upper-tier switches in the subnetwork, from which the data packet exits the subnetwork through a second trunk link.

4. The method according to claim 1, wherein defining the corresponding detour route comprises defining multiple detour routes for use in case of failures of multiple ones of the local links in the given subnetwork.

5. The method according to claim 1, wherein defining the corresponding detour route comprises, for any given local link, applying the corresponding detour route in rerouting the data packets arriving in the given subnetwork over any of a plurality of the primary routes of which the given local link is a part, such that the primary routes continue to pass through the first upper-tier switch notwithstanding failures of the given local link.

6. The method according to claim 5, wherein configuring the primary routes comprises defining an adaptive routing group comprising the primary routes that are destined to the given subnetwork irrespective of the lower-tier switches to which the primary routes are directed, such that upon failures of any of the local links within the given subnetwork, the primary routes in the adaptive routing group are rerouted over detour routes within the given subnetwork.

7. A communication system, comprising:
a network comprising multiple subnetworks interconnected by trunk links, each subnetwork comprising multiple switches, which are configured to communicate via at least first and second virtual lanes and are arranged in a bipartite topology comprising an upper tier containing upper-tier switches, which are connected to one or more of the trunk links, and a lower tier containing lower-tier switches, which are connected by local links to the upper-tier switches; and
a management processor, which is configured to define primary routes for delivery of data packets in the network, to partition the local links in each subnetwork into at least first and second groups, and for each local link that is a part of one or more of the primary routes and connects a first upper-tier switch to a first lower-tier switch in a given subnetwork, to define a corresponding detour route passing through a first local link belonging to the first group from the first upper-tier switch to a second lower-tier switch within the given subnetwork, and from the second lower-tier switch over a second local link to a second upper-tier switch in the given subnetwork, and from the second upper-tier switch over a third local link belonging to the second group to the first lower-tier switch,
wherein the switches in the given subnetwork are configured, upon a failure of the local link connecting the first upper-tier switch to the first lower-tier switch, to reroute the data packets arriving at the first upper-tier switch for transmission to the first lower-tier switch so that the data packets pass through the corresponding detour route to the first lower-tier switch, while transmitting the data packets over the second and third local links via the second virtual lane.

8. The system according to claim 7, wherein the lower-tier switches comprise leaf switches, which are configured to deliver the data packets received in the given subnetwork via the detour route to a network end-node that is connected to one of the leaf switches.

9. The system according to claim 7, wherein the management processor is configured to partition the links in each subnetwork to define a third group of the links,
wherein the detour routes are configured through the first and second groups of the links for the data packets that are destined for network end-nodes that are connected to the given subnetwork, and
wherein the management processor is configured to define at least one dive-through route over which a data packet enters the subnetwork via the first virtual lane through a first trunk link to one of the upper-tier switches in the subnetwork, passes through one of the links in the third group to one of the lower-tier switches in the subnetwork and through another one of the links via the second virtual lane to another one of the upper-tier switches in the subnetwork, from which the data packet exits the subnetwork through a second trunk link.

10. The system according to claim 7, wherein the management processor is configured to define multiple detour routes for use in case of failures of multiple ones of the local links in the given subnetwork.

11. The system according to claim 7, wherein for any given local link, the corresponding detour route is applied in rerouting the data packets arriving in the given subnetwork over any of a plurality of the primary routes of which the given local link is a part, such that the primary routes continue to pass through the first upper-tier switch notwithstanding failures of the given local link.

12. The system according to claim 11, wherein the management processor is configured to define an adaptive routing group comprising the primary routes that are destined to the given subnetwork irrespective of the lower-tier switches to which the primary routes are directed, such that upon failures of any of the local links within the given subnetwork, the primary routes in the adaptive routing group are rerouted over detour routes within the given subnetwork.

13. A method for communication, comprising:
partitioning local links in a subnetwork of a packet data network into at least first and second groups;
for each local link that connects a first upper-tier switch to a first lower-tier switch in the subnetwork, defining a corresponding detour route passing through a first local link belonging to the first group from the first upper-tier switch to a second lower-tier switch, and from the second lower-tier switch over a second local link to a second upper-tier switch, and from the second upper-tier switch over a third local link belonging to the second group to the first lower-tier switch; and
upon a failure of the local link connecting the first upper-tier switch to the first lower-tier switch, rerouting data packets arriving from the network at the first upper-tier switch for forwarding over the local link, so that the data packets pass via the corresponding detour route to the first lower-tier switch.

14. The method according to claim 13, wherein defining the corresponding detour route comprises defining multiple detour routes for use in case of failures of multiple ones of the local links in the given subnetwork.

15. The method according to claim 13, wherein defining the corresponding detour route comprises, for any given local link, applying the corresponding detour route in rerouting the data packets arriving in the given subnetwork over any of a plurality of the primary routes of which the given local link is a part, such that the primary routes continue to pass through the first upper-tier switch notwithstanding failures of the given local link.

16. The method according to claim 13, wherein rerouting the data packets comprises receiving the data packets from the network, and forwarding the data packets via a specified virtual lane from the second lower-tier switch over the second local link to the second upper-tier switch.

17. A method for communication, comprising:
configuring primary routes for delivery of data packets in a network comprising multiple subnetworks interconnected by trunk links, each subnetwork comprising multiple switches in a bipartite topology comprising an upper tier containing upper-tier switches, which are connected to one or more of the trunk links, and a lower tier containing lower-tier switches, which are connected by local links to the upper-tier switches;
for any given local link that is a part of one or more of the primary routes and connects a first upper-tier switch to a first lower-tier switch in a given subnetwork, defining a corresponding detour route passing through the local links within the given subnetwork from the first upper-tier switch to a second lower-tier switch, and from the second lower-tier switch to a second upper-tier switch and from the second upper-tier switch to the first lower-tier switch;
when the given local link is a part of a plurality of the primary routes, applying the corresponding detour route to all of the plurality of the primary routes of which the given local link is a part, such that the primary routes continue to pass through the first upper-tier switch notwithstanding failures of the given local link; and
upon a failure of the local link connecting the first upper-tier switch to the first lower-tier switch, rerouting the data packets arriving at the first spine switch in the given subnetwork to pass via the corresponding detour route to the first lower-tier switch.

18. The method according to claim 17, wherein configuring the primary routes comprises defining an adaptive routing group comprising the primary routes that are destined to the given subnetwork irrespective of the lower-tier switches to which the primary routes are directed, such that upon failures of any of the local links within the given subnetwork, the primary routes in the adaptive routing group are rerouted over detour routes within the given subnetwork.

* * * * *